(12) United States Patent
Penaloza et al.

(10) Patent No.: US 6,644,724 B1
(45) Date of Patent: Nov. 11, 2003

(54) COMPACTABLE EXTENDED CAB MODULAR BUNK ASSEMBLY

(75) Inventors: Joseph T. Penaloza, Fort Wayne, IN (US); James W. Miller, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/282,600

(22) Filed: Oct. 29, 2002

(51) Int. Cl.$^7$ ................................. B62D 33/06
(52) U.S. Cl. ......................... 296/190.02; 5/118
(58) Field of Search ............... 296/190.02, 24.1; 5/110, 111, 313.1, 118, 620

(56) References Cited

U.S. PATENT DOCUMENTS

| | | | |
|---|---|---|---|
| 337,415 A | * 3/1886 | McKeough | 5/111 |
| 4,107,797 A | * 8/1978 | Maxwell, Sr. | 5/118 |
| 4,108,487 A | * 8/1978 | Spohn | 5/118 |

\* cited by examiner

*Primary Examiner*—Dennis H. Pedder
(74) *Attorney, Agent, or Firm*—Jeffrey P. Calfa; Dennis Kelly Sullivan; Susan L. Lukasik

(57) ABSTRACT

A modular bunk assembly or module provides for easy in situ installation of the bunk in an extended cab truck by compacting to a slab like profile for shipment and handling and easily expanding in the cab for installation. The bunk is readily adapted to provide attachment points corresponding to common attachment points for vehicle seats. The bunk further provides a readily reached storage area under a bed platform. Restraints may already be installed on the module when it is shipped to an automotive assembly plant.

7 Claims, 5 Drawing Sheets

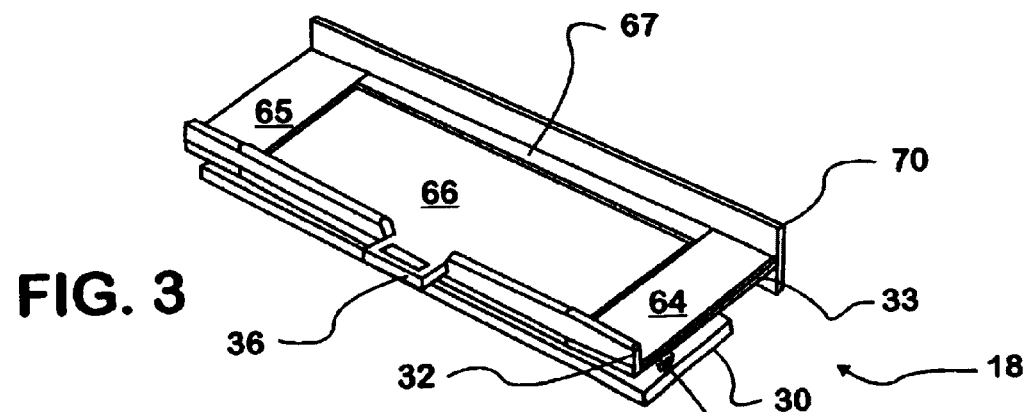
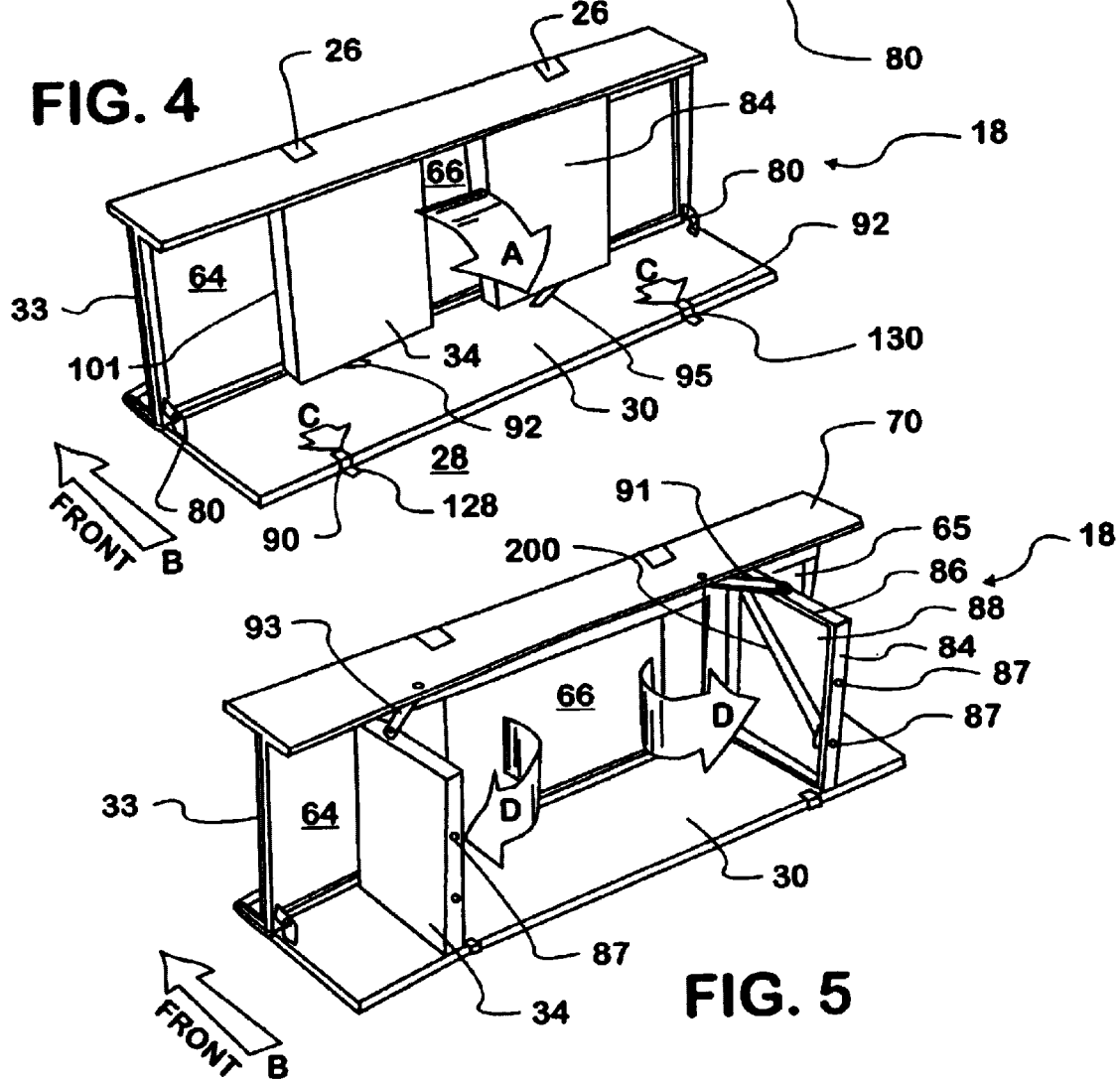

COMPACTABLE EXTENDED CAB MODULAR BUNK ASSEMBLY

BACKGROUND OF THE INVENTION

1. Field of the Invention

The present invention relates to the installation of accessories in vehicles, and, more particularly, to a compactable, modular bunk which may be readily introduced to a vehicle cab for installation on either the production line or at a dealer's.

2. Description of the Problem

Extended cab trucks come in a number of configurations depending upon operator preferences. The area aft of the front seats may be used to provide additional seating or to provide a bunk and storage area, among other less common options. The installation of a bunk in the confined space of a truck extended cab, either on the production line, or as an after market accessory, can prove quite cumbersome and difficult. It being difficult to accurately assemble a bunk in situ, it is usually preferable to install an already assembled bunk. However, an assembled bunk can be bulky and difficult to maneuver in through the cab doors into the small position behind the front seat area. In some extended cabs, such a bunk fills substantially all of the floor area behind the front seats and, of necessity, are installed flush against the back and side interior walls of the cab. The bunk should be modular to substantially eliminate any need to modify the base truck interior to accommodate the bunk.

It is also preferable that a bunk arrangement provide accessible, internal storage space. Since it cannot consistently be expected that drawers may be provided opening toward the front of the vehicle due to the close proximity of the front seats, the bunk should be made to be top opening to gain access to the interior of the bunk.

SUMMARY OF THE INVENTION

According to the invention there is provided a compactable, modular bunk assembly comprising a generally rectangular bed platform having upper and lower major surfaces. Supporting the platform after installation are a pair of parallel, mutually spaced, side support panels pivotally mounted with respect to the lower major surface of the rectangular bed platform and parallel to end edges of the rectangular bed platform to allow the side support panels to be folded substantially flush against the lower major surface. A front panel is pivotally mounted with respect to the lower major surface and along one edge of the rectangular bed platform to allow the front panel to be folded parallel to the major surface outside of the folded side support panels. A fixed back member is mounted to the bed platform along an edge of the bed platform parallel to the edge along which the front panel is mounted. Upon assembly, the front panel functions as a load bearing rectangular member when unfolded to bring one edge thereof into flush contact with the lower surface. The bed platform includes a lifting lid section between the side support panels.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 3–6 are a series of perspective views of the bunk of the invention being expanded upon installation in a vehicle;

DETAILED DESCRIPTION OF THE INVENTION

Figure 1:
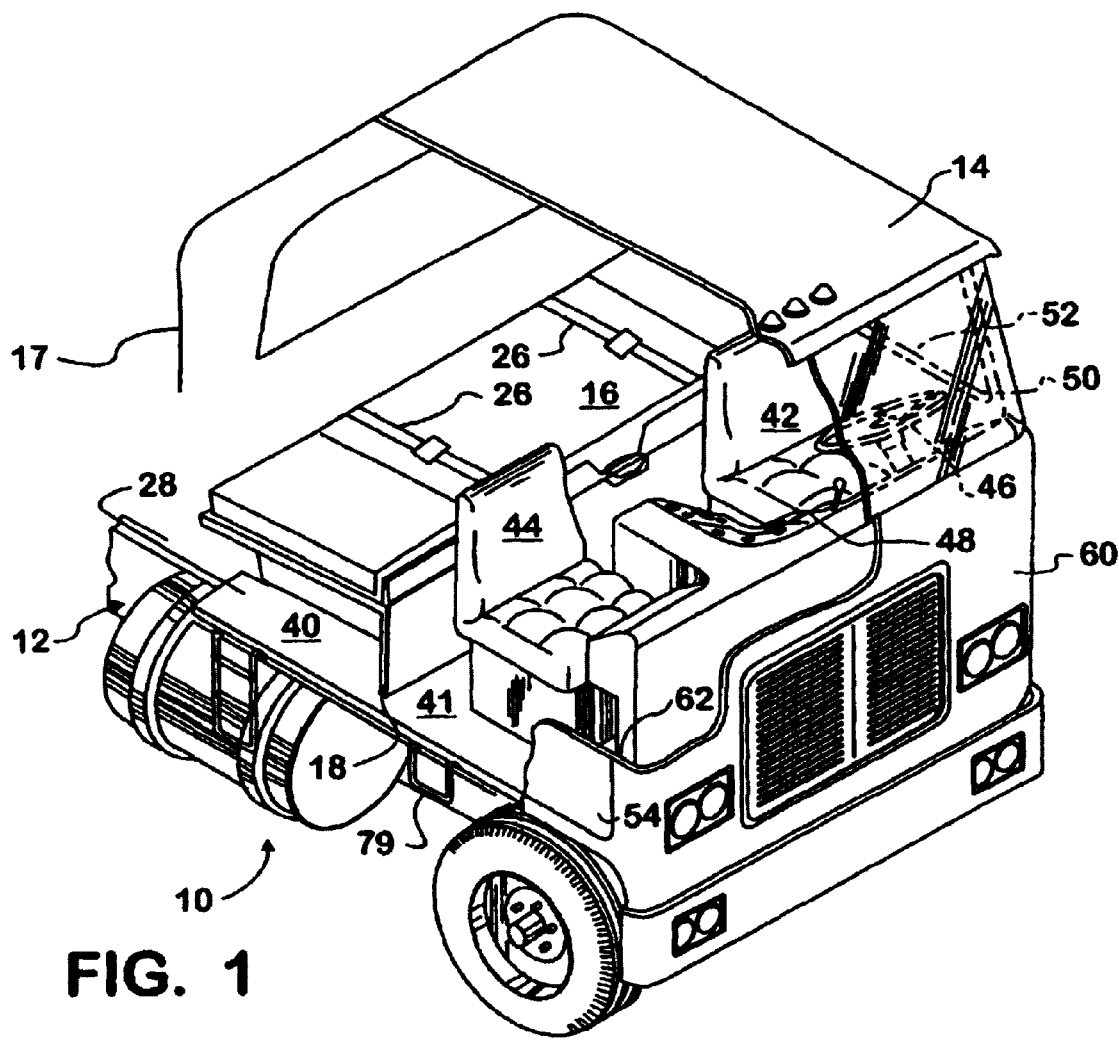
FIG. 1 is a perspective view of a truck cab partially cut away to show a bunk fitted aft of the forward seating area in an extended cab truck.

Referring now to the figures, in FIG. 1 is depicted a truck 10 having a cab 14 mounted on a pair of frame side rails 12 (passenger side only shown). Truck 10 is depicted as a cab over design, although the invention is equally applicable to other cab configurations. Cab 14 comprises four exterior sidewalls, including a front sidewall 60, a driver sidewall (not visible), a passenger sidewall 62 and a backwall 17, which enclose an interior space 16. Cab 14 is an extended cab and provides a small, but usable, area 40 aft of the front seats 42 and 44. Interior space 16 is divided functionally into an operator area 41 forward and aft area 40. The operator area includes a driver's seat 42 having access to a steering wheel 46 and an instrument and control panel 48. The driver seat 42 and passenger seat 44 are positioned to good views through windshield 50 and to be next to doors 52 and 54 for easy egress from the vehicle. Fixed exterior ladders 79 located near the doors help with getting into and out of the vehicle.

Figure 2:
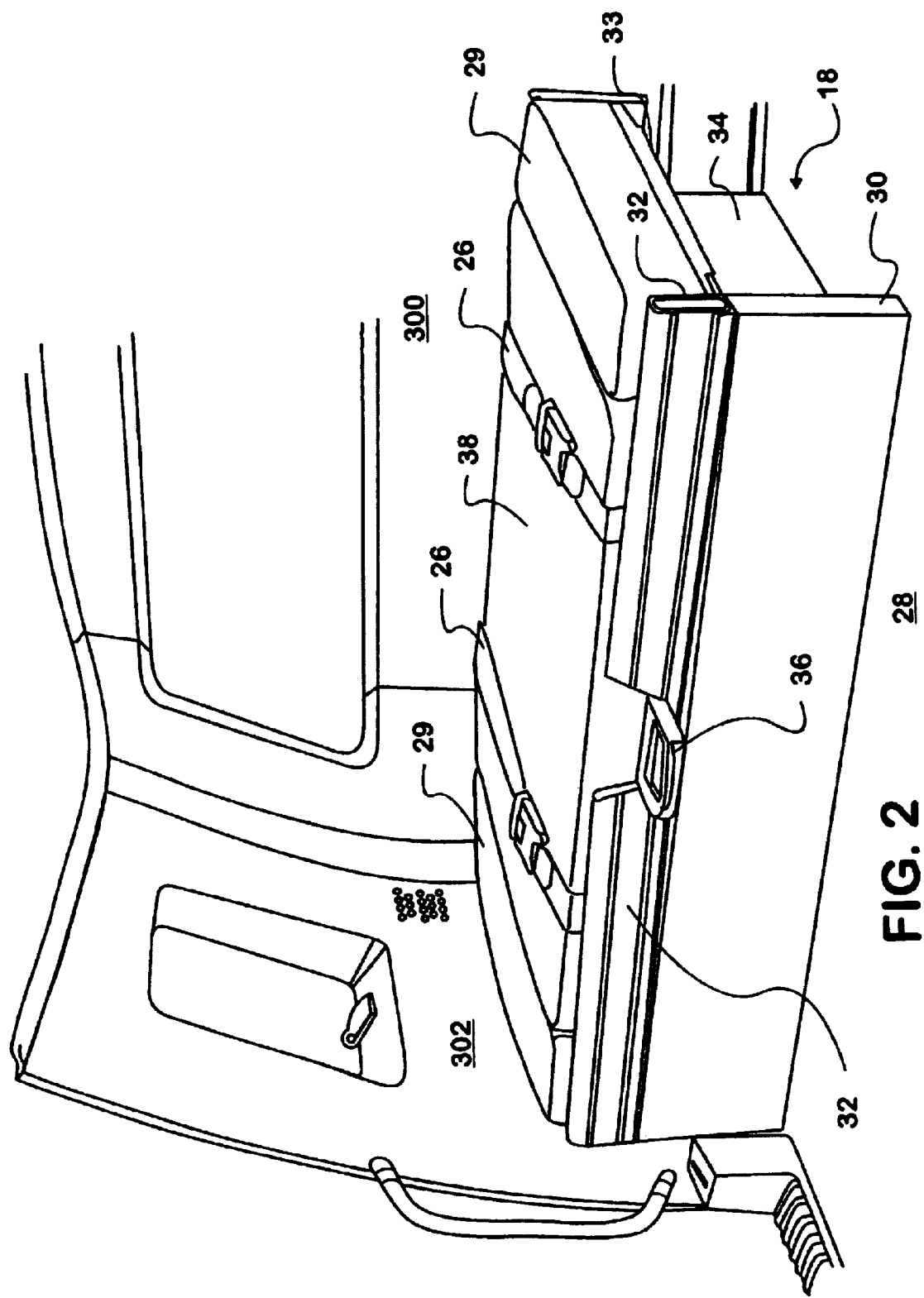
FIG. 2 is a perspective view of an the modular bunk of the invention installed in a vehicle.

A bunk assembly 18 is located in aft area 40 located snugly against a back trimwall 300 and side trimwalls including trimwall 302 as seen in FIG. 2. Bunk 18 rests on floor 28 and occupies most of the floor space in aft portion 40. Personnel Bunk Restraints 26 may be installed with the bunk allowing it to be used by a relief driver during vehicle operation or as a bench seat. As an alternative to safety belts, a net may be provided as a passenger restraint, which may be desirable if the bunk 18 is intended for use while the vehicle is operated.

FIG. 2 is a perspective view of bunk assembly 18. Bunk 18 comprises several parts including a forward support wall 30 which is located under the forward edge of the outer perimeter of a bed platform 33. A forward retaining lip 32 extends above forward support wall 30 on bed platform 33, preventing side cushions 29 and mattress 38 from sliding forward off of platform 33. Visible under the driver side front corner of platform 33 is a side support wall 34, which is recessed from the outer edge of the platform. Mattress 38 overlies a lid to a storage compartment, which lid may be lifted using a handle 36 which extends forward from just above the top center portion of forward support wall 30. Trimwalls 300 and 302 line the interior faces of the vehicle's exterior walls.

Figure 9:
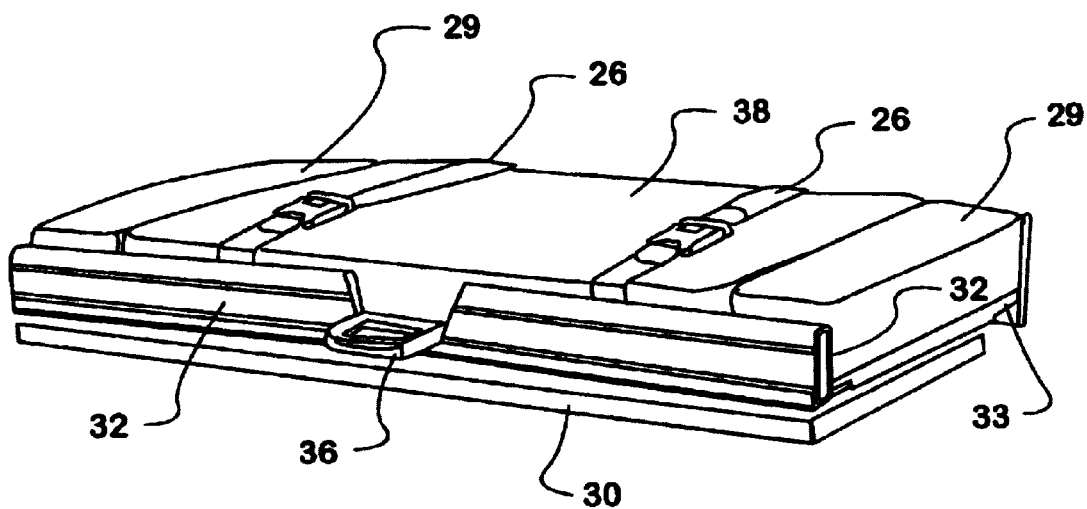
FIG. 9 is a perspective view of the modular bunk assembly compacted and prepared for shipping.

FIGS. 3 through 6 illustrate expansion of modular bunk assembly 18 from a compacted state for shipping to an expanded state for installation into a vehicle. Bunk 18 is shipped in a compacted state (illustrated in FIG. 9). In its compacted state bunk 18 is substantially flat. The side panels 34 and 84 are tucked up directly under the platform 33 and forward support wall 30 is folded over the side panels. In this compacted state very little unoccupied space remains within the orthogonal dimensions of the bunk 18 and, except for handle 36, very little extends beyond the rectangular limits of the major surfaces of platform 33. In the compacted state passenger restraints 26 attached to the forward retaining lip 32 and to the back wall or also referred to as the fixed back member 70 may be used to hold mattress 38 in place. Latch/handle 36 keeps lid 66 secure during expansion of bunk 18. The storage space under lid 66 is comprised of the front panel, the left and right side panels, 34 and 88, fixed back member 70 and the cab floor. The fixed back member 70 provides the bunk module its "backbone" for strength. It is also where the restraints are anchored to the bunk. The is back member 70 is therefore the load path for the bunk.

For installation, the front seats 42 and 44 of a vehicle cab are removed and bunk 18 is introduced to the cab through the passenger side door 54 in a compacted state. After introduction of the bunk 18 to the interior space 16 of a vehicle cab, expansion of the bunk for installation is begun by rotating front support wall 30 on joints 80 downwardly in the direction indicated by the letter A to a position perpendicular to bed platform 33 with the upper edge of the support wall directly under the forward edge of the platform. Support wall 30 then lies on the cab floor 28 with the upper surface of the bed platform 33 oriented to face the front of the vehicle indicated by arrow "B". Joints 80 are located toward the head and foot of platform 33 and have an axis of rotation spaced from the bottom surface of platform 33 to provide a gap between wall 30 and the bottom surface wide enough to allow sidewalls 34 and 84 to be retained between the forward wall and the platform when bunk 18 is compacted. Bed platform 33 may be seen to comprise side sections 64 and 65 and a center lid 66. Forward retaining lip 32 and back wall 70 line the opposite, elongated sides of bed platform 33. Between the lid 66 and back wall 70 is a fixed platform section 67. Back wall 70 and platform 67 provide structural integrity to the rearward portion of bunk 18 and provide a connection between the two side panels 34 and 84.

For installation, the bunk 18 is slid along floor 28 toward the back of the cab (the opposite direction from B) so that catches 90 and 92 are introduced to depressions 128 and 130 on floor 28. Conventionally, some sort of depression is provided in cab floors for use in installing rear seats. These can be used with modular bunk assembly 18, possibly by providing that the catches 90 and 92 are positionable along the bottom edge of forward support wall 30. This avoids any need for modification to the bare interior shell of the cab into which the bunk 18 is to be installed. Catches 90 and 92 help position bunk 18 with respect to the cab's interior side and back trim. In addition, there is no need to worm bunk 18 into position. Due to the compactness of the bunk 18, it can be slid into the cab through a cab door.

FIG. 5 illustrates the positioning of side panels 34 and 84. As indicated by the letters "D", side panels 34 and 84 open like wings toward the opposite ends of the bed platform 33 until the panels are perpendicular to and directly underneath platform 33. Side panels 34 and 84 are braced in position by struts 97, 93, 91 and 95 which may be connected between the sides of the wall to the underside of platform 33 and to the back retaining wall 70. Side panels 34 and 84 support bed platform 33 from outside of the area of lid 66. A piano hinge 101 may be used to attach a sidewall to the bed platform 33. The piano hinge pin 101 may be attached to panels 64 and 65 of the platform 33 as well as the side panels at flange 86.

Side panels 34 and 84 are fabricated with an open box geometry frame comprising a perimeter flange 86, (visible with respect to side support wall 84 only), which strengthens the panel and provides rigidity. Panel 88 of side panel 84 is attached to flange 86 by welding and positioned to the outside of the box frame relative to the interior space to be enclosed. In one embodiment, the side panels 88 and 34 are made by folding the edge of sheet metal over and welding the corners together to form an open box geometry. This adds strength. After installation of bunk 18, panel walls 34 and 84, forward support wall 30, lid 66, floor 28 and back interior trim wall 300 enclose the space under lid 66 to define a storage area. Bolts may be positioned through holes 87 in the bottom of perimeter flange 86 to secure bunk assembly 18 to floor 28. As may be seen below, the bolts may introduced from above through the opening, which is usually closed by lid 66. A cross brace 200 (visible with respect to panel 84 only) may be added between a mounting hole 87 to the back side of perimeter flange 86 of side panels 34 and 84. Cross braces 200 add strength to side panels 34 and 84.

Figure 6:
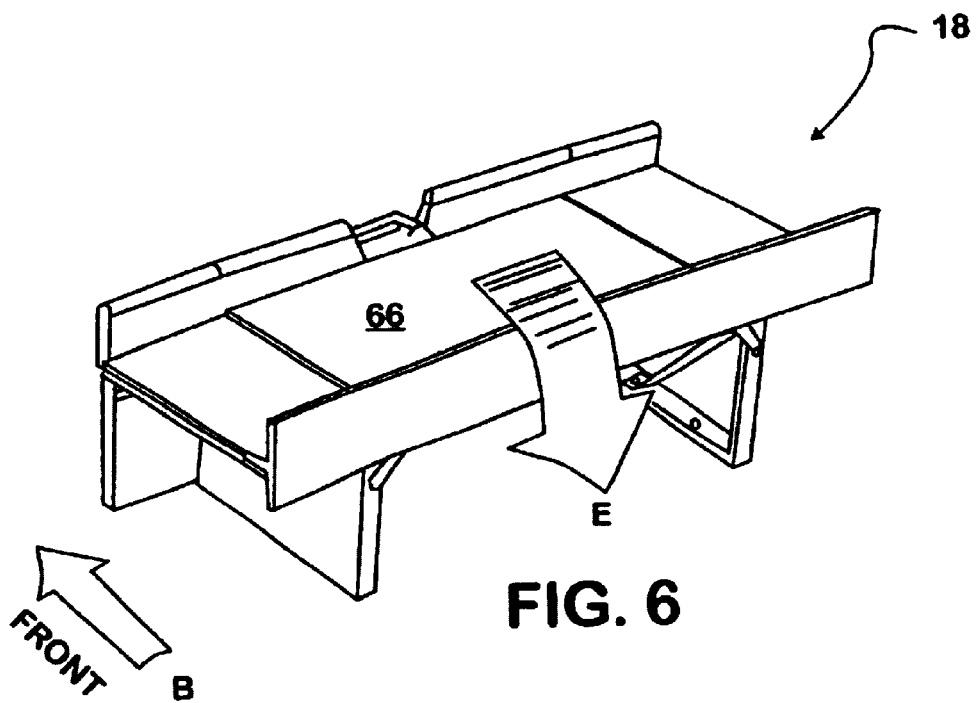
Figure 7:
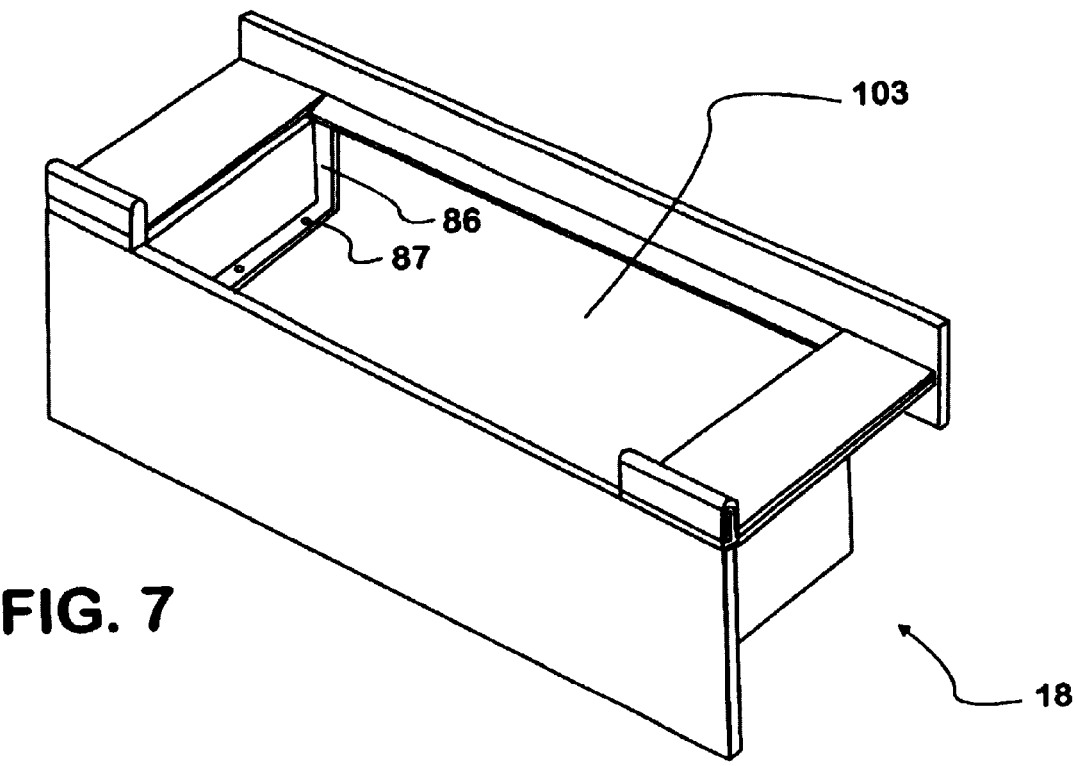
FIG. 7 is a perspective view of the bunk of the invention with the storage compartment lid removed.
Figure 8:
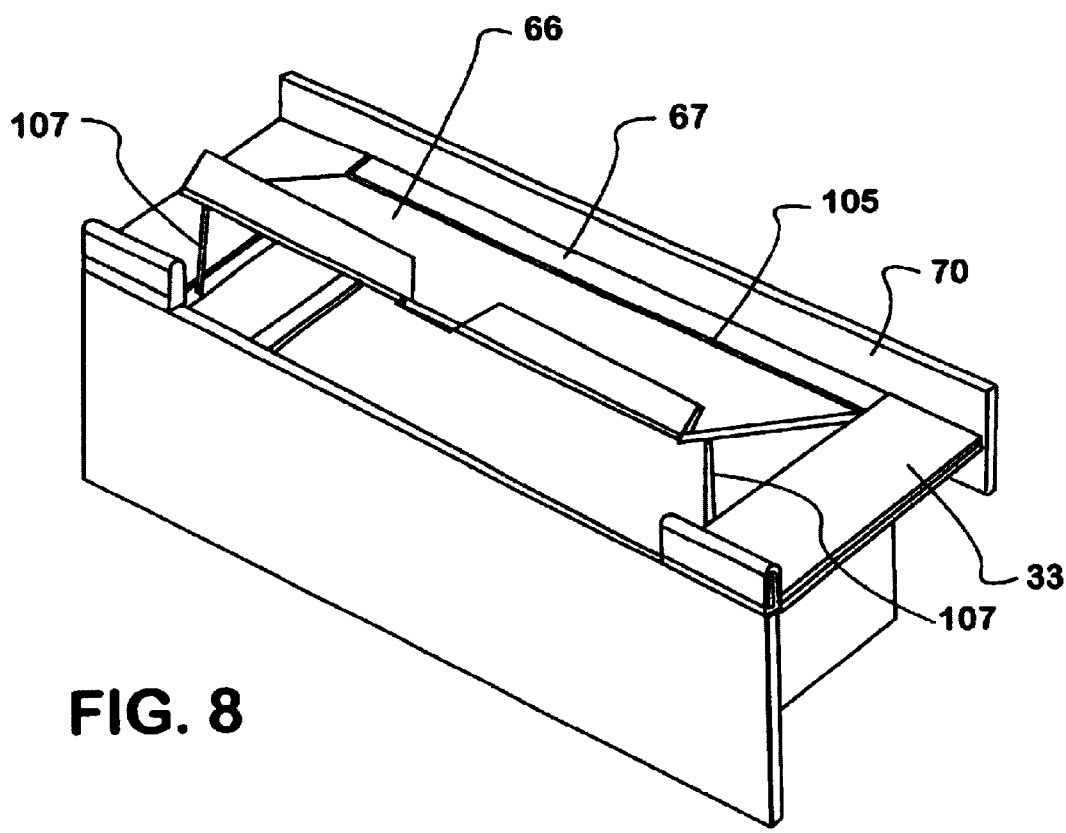
FIG. 8 is a perspective view of the bunk of the invention showing the storage compartment lid opened.

To complete installation, bunk assembly 18 is rotated as indicated by letter E in FIG. 6, pushed flush against backwall 17, and connected to the floor of a vehicle. Bolts securing the assembly to the floor of a vehicle may be added by opening lid 66 to access the holes 87 through perimeter flanges 86. Referring to FIG. 7, an opening 103 through the top of bunk 18 is illustrated with lid 66 removed, to better illustrate the storage area defined within the bunk 18 and the easy access provided to the holes 87. FIG. 8 illustrates the bunk assembly 18 with lid 66 installed. Lid 66 is attached to by a piano hinge or similar connection 105 to fixed back section 67 of platform 33. Telescoping gas struts 107 or similar devices may be used to support lid 66 when opened.

The invention provides easy in situ installation of a bunk assembly in an extended cab truck and an assembly which compacts to a slab like profile for shipment. The assembly is readily adapted to provide attachment points corresponding to common attachment points for vehicle seats. The bunk assembly further provides a readily reached storage area under a bed platform.

While the invention is shown in only one of its forms, it is not thus limited but is susceptible to various changes and modifications without departing from the spirit and scope of the invention.

What is claimed is:

1. A modular bunk assembly comprising:
   a generally rectangular bed platform having upper and lower major surfaces;
   a pair of parallel, mutually spaced, side support panels, which are positionable with respect to the lower major surface of the rectangular bed platform and parallel to end edges of the rectangular bed platform for supporting the bed platform and further positionable folded substantially flush against the lower major surface of the bed platform;
   front panel pivotally mounted with respect to the lower major surface and along one side of the rectangular bed platform to allow the front panel to be folded parallel to the lower major surface outside of the folded side support panels and to allow the front panel to be unfolded to support the bed platform along the side thereof; and
   a fixed back member mounted to the bed platform along an edge of the bed platform parallel to the edge along which the front panel is mounted.

2. modular bunk assembly as set forth in claim 1, further comprising:

the front panel functioning as a load bearing rectangular member when unfolded to bring one edge thereof into flush contact with the lower surface; and the side support panels functioning as load bearing rectangular members when unfolded to bring one edge each thereof into flush contact with the lower surface.

3. A modular bunk assembly as set forth in claim 2, further comprising:

the bed platform including a lifting lid section between the side support panels.

4. A modular bunk assembly as set forth in claim 3, wherein the side support panels include box frames oriented to be open toward one another.

5. A modular bunk assembly as set forth in claim 4, wherein the front panel includes catches along a bottom edge for engaging retainers in a vehicle floor.

6. A modular bunk assembly as set forth in claim 5, wherein the side support panels include closure panels to define a storage area underneath the lifting lid section.

7. A motor vehicle comprising:

a cab enclosure including a floor, a back wall and parallel side walls defining a volume behind an operator area;

a modular bunk installed in the cab enclosure behind the operator area, the modular bunk comprising a mattress platform, a load bearing front member for positioning under one edge of the mattress platform and first and second load bearing intermediate members positionable perpendicular to the front member and under the mattress platform for supporting the mattress platform; and pivoting connections positioned with respect to the mattress platform and the first and second load bearing intermediate members allowing the first and second load bearing members to be folded under the mattress platform and a pivoting connection positioned with respect to the mattress platform and the front panel allowing the front panel to be folded parallel to the mattress platform with the first and second load bearing members between the front panel and the mattress platform.

\* \* \* \* \*